(12) United States Patent
Dam et al.

(10) Patent No.: US 7,990,851 B2
(45) Date of Patent: Aug. 2, 2011

(54) METHOD, APPARATUS AND COMPUTER PROGRAM PRODUCT FOR REDUNDANT RING COMMUNICATION

(75) Inventors: Hai Thanh Dam, Cedar Park, TX (US); Ernest Amador Cisneros, Leander, TX (US); Daniel Lee McLaughlin, Cedar Park, TX (US); Nick Verlenich, Jr., Leander, TX (US)

(73) Assignee: Weed Instrument, Inc., Round Rock, TX (US)

( * ) Notice: Subject to any disclaimer, the term of this patent is extended or adjusted under 35 U.S.C. 154(b) by 191 days.

(21) Appl. No.: 12/269,015

(22) Filed: Nov. 11, 2008

(65) Prior Publication Data
US 2009/0122695 A1    May 14, 2009

Related U.S. Application Data (60) Provisional application No. 60/987,086, filed on Nov. 11, 2007.

(51) Int. Cl.
*G08C 15/00* (2006.01)
(52) U.S. Cl. .......................... 370/223; 370/222; 709/251
(58) Field of Classification Search .................. 370/222, 370/223; 709/251
See application file for complete search history.

(56) References Cited

U.S. PATENT DOCUMENTS

| | | | |
|---|---|---|---|
| 28,958 A | 7/1860 | Blood | |
| 3,859,468 A | 1/1975 | Smith | |
| 4,446,551 A | 5/1984 | Seo | |
| 4,850,042 A | 7/1989 | Petronio | |
| 5,159,595 A | 10/1992 | Flanagan | |
| 6,307,652 B1 | 10/2001 | Fassih-Nia | |
| 6,430,151 B1 | 8/2002 | Glas | |
| 6,697,874 B1 | 2/2004 | Friden | |
| 6,763,190 B2 | 7/2004 | Agrawal et al. | |
| 6,766,482 B1 | 7/2004 | Yip | |
| 6,782,198 B1 | 8/2004 | Liu | |
| 6,892,329 B2 | 5/2005 | Bruckman | |
| 6,928,050 B2 | 8/2005 | Lynch et al. | |
| 6,980,745 B2 | 12/2005 | Deguchi et al. | |
| 7,035,537 B2 | 4/2006 | Wang et al. | |
| 7,039,312 B1 | 5/2006 | Condict et al. | |
| 7,269,346 B1 | 9/2007 | Iyer et al. | |

(Continued)

OTHER PUBLICATIONS

2C30 Self-Healing Ring Module Installation Instructions, Jun. 2004, Weed Instrument Co., Inc., Round Rock, TX.

(Continued)

*Primary Examiner* — Jason E Mattis
(74) *Attorney, Agent, or Firm* — Anthony V. S. England (57) ABSTRACT

Sets of communication modules each have a pair of ring-channel ports for a ring-configured channel in a network, a peripheral device port for peripheral device data, and dual-ring ports for an inter-ring channel for the pair of modules. First and second ones of a set of communication modules send duplicate data packets on their respective first and second rings. Responsive to duplicate data packets arriving via the rings at first and second modules in a next set within a predetermined time interval of one another, each of the next modules transmits its ring-channel received data packet out a downstream ring-channel port. Responsive to one of the duplicate packets arriving at the DRP of a module a predetermined time interval before arriving at a ring-channel port of the module, the module sends the corresponding packet received at the DRP out its other ring-channel port and its peripheral device port.

24 Claims, 8 Drawing Sheets

U.S. PATENT DOCUMENTS

| | | | |
|---|---|---|---|
| 7,277,631 | B1 | 10/2007 | Iyer et al. |
| 7,295,776 | B2 | 11/2007 | Okubo et al. |
| 7,298,693 | B1 | 11/2007 | Owens et al. |
| 7,315,510 | B1 | 1/2008 | Owens et al. |
| 7,339,887 | B2 | 3/2008 | Griswold |
| 2003/0133444 | A1 | 7/2003 | Wakamatsu |
| 2004/0081083 | A1 | 4/2004 | Sekihata |
| 2004/0131354 | A1 | 7/2004 | Kim et al. |
| 2006/0224659 | A1* | 10/2006 | Yu ................................ 709/201 |
| 2006/0245351 | A1 | 11/2006 | Pande |
| 2007/0008964 | A1 | 1/2007 | Rose |
| 2007/0206618 | A1* | 9/2007 | Zelig et al. .................... 370/404 |
| 2007/0242604 | A1* | 10/2007 | Takase et al. ................. 370/223 |
| 2008/0170495 | A1* | 7/2008 | Monse et al. ................. 370/223 |
| 2008/0222447 | A1* | 9/2008 | Ram et al. ......................... 714/2 |
| 2010/0034204 | A1* | 2/2010 | Sakauchi ..................... 370/400 |

OTHER PUBLICATIONS

2C23 Profibus Compatible Self-Healing Electrical Interface Installation Instructions, Dec. 2005, Weed Instrument Co., Inc., Round Rock, TX.

2C30 Self-Healing Ring Module Product Catalog page, Jun. 2004, Weed Instrument Co., Inc., Round Rock, TX.

2C23 Profibus Compatible Self-Healing Electrical Interface Product Catalog page, Dec. 2005, Weed Instrument Co., Inc., Round Rock, TX.

ControlNet International Specification, Version 2.0, Mar. 31, 1998 (including errata 1, Jul. 1, 1999 and errata 2, Dec. 31, 1999), ControlNet, Boca Raton, FL.

Allen-Bradley ControlLogix ControlNet Interface Module User Manual, Publication 1756-6.5.3, Dec. 1999, Rockwell Automation, Mayfield Heights, OH.

Allen-Bradley ControlLogix Redundancy System User Manual, Publication 1756-UM523F-EN-P, Dec. 2006, Rockwell Automation, Mayfield Heights, OH.

Allen-Bradley ControlNet Coax Media Planning and Installation Guide, Publication CNET-IN002A-EN-P, Dec. 2001, Rockwell Automation, Mayfield Heights, OH.

Allen-Bradley ControlNet Fiber Media Planning and Installation Guide, Publication CNET-IN001B-EN-P, Jul. 2004, Rockwell Automation, Mayfield Heights, OH.

Nonfinal Office action issued on Apr. 22, 2011 in U.S. Appl. No. 12/269,007, inventors: Hai Thanh Dam, Ernest Amador Cisneros, Daniel Lee McLaughlin, Nick Verlenich Jr., assignee: Weed Instrument Company, Inc.

* cited by examiner

METHOD, APPARATUS AND COMPUTER PROGRAM PRODUCT FOR REDUNDANT RING COMMUNICATION

CROSS-REFERENCE TO RELATED APPLICATION

This application is related to METHOD, APPARATUS AND COMPUTER PROGRAM PRODUCT FOR RING NETWORK COMMUNICATION, which is assigned to the same assignee of the present application, filed on the same date as the present application, and is hereby incorporated herein by reference; and is related to and claims priority pursuant to 35 U.S.C. 199 to provisional U.S. Patent Application Ser. No. 60/987,086 entitled "UNIVERSAL SELF-HEALING RING," filed Nov. 11, 2007.

BACKGROUND OF THE INVENTION

1. Field of the Invention

This invention relates to communication systems and particularly to such systems for use in industrial control applications. More particularly, the invention relates to a dual-ring configured, network communication system that continues uninterrupted communication even in the event of a failure in communication lines.

2. Background

According to certain dual channel communication methods and systems, information is sent twice over respective communication channels. The information is in data packets. If one of the communication channels breaks, the information is still delivered on the remaining channel. (Channels also referred to herein as "paths.") Dual channel communication is used in situations where it is critical that information be delivered within a certain time frame in spite of limited communication path failure. In such critical situations, another alternative is to propagate communication twice in respective directions in a single, ring-configured communication channel. In this manner, if communication in one direction fails, information is still delivered in the other direction around the ring.

Both dual channel and single-ring type systems work well when only one of two transmission paths fails. However, some users demand a network that continues to deliver communication despite multiple transmission path failures. One way to meet this demand is to configure dual communication channels into respective rings. However, this may be problematic when using a communication protocol that requires duplicate data packets to arrive at the same node in separate communication paths within a predetermined time interval relative to one another. An example is the ControlNet standard, which was defined by Allen Bradley and is now supported by Rockwell Automation, for example.

("ControlNet" is a trademark of ControlNet International Ltd.) In particular, ControlNet requires packets in respective communication channels to arrive at the same destination ControlNet node within 1.6 μs of each other. This application hereby incorporates by reference ControlNet International Specification 2.0 in its entirety.

SUMMARY OF THE INVENTION

The present invention addresses this problem, in one aspect, by sharing packets between first and second channels of a ring-configured dual channel communication system. In one form of the invention, an communication system includes sets of communication modules each having a pair of ring-channel ports for a ring-configured channel in a network, a peripheral device port for peripheral device data, and dual-ring ports for an inter-ring channel for the pair of modules. The modules are operable such that first and second ones of a set of communication modules send duplicate data packets on their respective first and second rings. Responsive to duplicate data packets arriving via the rings at first and second modules in a next set within a predetermined time interval of one another, each of the next modules transmits its ring-channel received data packet out a downstream ring-channel port. Responsive to one of the duplicate packets arriving at the DRP of a module a predetermined time interval before arriving at a ring-channel port of the module, the module sends the corresponding packet received at the DRP out its other ring-channel port and its peripheral device port.

In another aspect, the communication modules are further operable to send status information on their inter-ring channels, including a module in the first ring-configured channel sending a link tag on each data packet sent out on its DRP. The link tag indicates to a receiving module in the second ring-configured channel which port of the module in the first ring-configured channel received the packet and which direction the packet is traveling.

In another aspect, communication modules are further operable to detect communication faults and send fault detection information on their inter-ring channels, in order to direct data packets around broken ring-channel segments that may exist between modules.

In another aspect, sending a communication fault includes a first module of a set notifying a second module in the same set via the inter-ring channel responsive to the first module detecting a communication fault, wherein the notification includes an indication which of the pair of ring-channel ports of the first module detected the fault.

In another aspect, communication modules are further operable to distinguish between transmit and receive faults.

In another aspect, for a transmit failure detected by a receiver of a module immediately adjacent and downstream of a first module and the failure arises from the first module's transmitter or from a break between the two modules, the module detecting the receive failure is operable to send the first module a transmit fault code in a status carrier between data packets. Responsive to receiving the transmit fault notice, the first module is operable to notify a module in the first module's set about the transmit fault via their inter-ring channel.

In another aspect, a fault code indicates to the module in the first module's set the port that has failed and the type of fault that was detected.

In another aspect, the modules in a ring-configured channel are configured to automatically deactivate a link between two adjacent modules responsive to a failure, but not automatically activate a link elsewhere in the ring responsive to detecting disruption of only a single communication path in the ring.

In a method form of the invention, sets of communication modules each have i) a pair of ring-channel ports connected to provide a ring-configured channel in a network, ii) a peripheral device port connected to a transmission segment for data to and from peripheral devices, and iii) dual ring ports ("DRP's") connected together providing an inter-ring channel for the pair of modules. The method includes first and second ones of a set of communication modules sending duplicate data packets on their respective first and second rings. Responsive to duplicate data packets arriving via the rings at first and second modules in a next set within a predetermined time interval of one another, each of the next modules transmits its ring-channel received data packet out a downstream ring-channel port. Responsive to one of the duplicate packets arriving at the DRP of a module a predetermined time interval before arriving at a ring-channel port of the module, the module sends the corresponding packet received at the DRP out its other ring-channel port and its peripheral device port.

In another aspect, the method includes communication modules sending status information on their inter-ring channels, including a module in the first ring-configured channel sending a link tag on each data packet sent out on its DRP. The link tag indicates to a receiving module in the second ring-configured channel which port of the module in the first ring-configured channel received the packet and which direction the packet is traveling.

In another aspect, the method includes communication modules detecting communication faults and sending fault detection information on their inter-ring channels, in order to direct data packets around broken ring-channel segments that may exist between modules.

In another aspect, the method includes sending a communication fault includes a first module of a set notifying a second module in the same set via the inter-ring channel responsive to the first module detecting a communication fault, wherein the notification includes an indication which of the pair of ring-channel ports of the first module detected the fault.

In another aspect, the method includes communication modules distinguishing between transmit and receive faults.

In another aspect, the method includes detecting a transmit failure by a receiver of a module immediately adjacent and downstream of a first module, wherein the failure arises from the first module's transmitter or from a break between the two modules. The module detecting the receive failure sends the first module a transmit fault code in a status carrier between data packets. Responsive to receiving the transmit fault notice, the first module notifying a module in the first module's set about the transmit fault via their inter-ring channel.

In another aspect, a fault code indicates to the module in the first module's set the port that has failed and the type of fault that was detected.

In another aspect, the method includes the modules in a ring-configured channel automatically deactivating a link between two adjacent modules responsive to a failure, but not automatically activating a link elsewhere in the ring responsive to detecting disruption of only a single communication path in the ring.

Computer program products including some or all aspects of the above-summarized methods and apparatuses are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

In the following detailed description of the preferred embodiments, reference is made to the accompanying drawings illustrating embodiments in which the invention may be practiced. It should be understood that other embodiments may be utilized and changes may be made without departing from the scope of the present invention. The drawings and detailed description are not intended to limit the invention to the particular form disclosed. On the contrary, the intention is to cover all modifications, equivalents and alternatives falling within the spirit and scope of the present invention as defined by the appended claims. Headings herein are not intended to limit the subject matter in any way.

The embodiments of the present invention are particularly well suited for application in a network that conforms to the widely used ControlNet communication protocol. ControlNet is one of only a few industrial protocols that support a redundant communication path. Plus ControlNet is a very high speed and deterministic protocol that has a predetermined time limit for communication between all network nodes. Specifically, according to the ControlNet protocol communication, modules of a node must receive identical packets on respective rings within 1.6 µs of one another.

The present invention addresses this problem, in one aspect, by sharing packets between first and second channels of a ring-configured dual channel communication system, which may be referred to as Redundant Ring Communication ("RRC"). A network includes dual, ring-configured channels (which may be referred to simply as "rings"). (The channels may be referred to herein as "fiber" or "fiber optic" channels, in reference to optical-type transmission media. However, it should be understood that the invention is not limited to channels having optical-type transmission media. For example, the channels may include electrical-type transmission media.) The network further includes transmission segments on which data enters/exits the rings for use by field devices, also referred to as peripheral devices. Communication on the peripheral device transmission segments conforms to ControlNet protocol. Peripheral device transmission segments are connected to sets of first and second communication modules that are, in turn, connected to the first and second rings, respectively. (The term "transmission segment" refers to a section of a transmission medium having no active components. Transmission segments may be electrical-type transmission media, such as coaxial cable, for example, or optical-type.)

In one embodiment of the invention, communication modules herein are not addressable devices on a ControlNet network, so they are not nodes in the sense that ControlNet defines "node." But from the standpoint of the ring network, the modules are members of nodes in at least the sense that they are active devices between fiber segments. Unless otherwise expressly indicated or clearly indicated at least from the context, the term "node" used herein generally refers to a node from the point of view of a ring.

RRC, as described herein, is an expansion of Universal Ring Communication ("URC"), which is described in the above referenced, related patent application. This expansion increases redundancy by providing a ring for each of two communication channels and by providing inter-ring communication channels at nodes in the rings. This arrangement provides the end user with multiple paths around fiber breaks.

In addition to having ports for their connections to the transmission segment and fiber ports for their ring-configured channels, the pair of communication modules at each transmission segment have dual ring ports ("DRP's") and are configured to be interconnected via their DRP's, providing an inter-ring channel for the pair. Communication among communication modules, including communication on the ring-configured channels and the inter-ring channels, may include communication that conforms to a different protocol than ControlNet.

The duplicate packets sent on the rings from a first set of modules travel down their respective ring-configured communication channels simultaneously, so that the packets will ideally arrive in the rings at both modules in the next set at approximately the same time. Each module transmits its received packet out all its remaining ports (never back to the receiving port). If, on the first ring-configured channel, for example, a packet arrives at the DRP of a module before arriving at one of the fiber ports of a module, this is due to a disruption of a fiber path in this first channel. When this event occurs, the module will use the corresponding packet received at the DRP from the second ring-configured channel and send this packet out the opposite fiber port and out the peripheral device port In this manner, the arrangement enables duplicate packets to arrive at each ControlNet node within a specified time interval in spite of certain failures. That is, the inter-ring channels allow communication to occur in spite of a greater number of broken fiber communication paths. As long as there is one continuous unbroken communication path from a source transmission segment to all destination segments, which may include inter-ring channel paths that allow information to cross over from one ring-configured channel to another, the communication system can transmit information from a source to all destinations. For example, a field device can suffer one channel failure through one of the communication modules of its transmission segment and still communicate through the transmission segment to the other communication module. Further, if a field device suffers a single fiber path failure, the field device can still send and receive information over both ring-configured channels as long as the inter-ring channel is still operable at the module set residing at each transmission segment.

The communication modules of a transmission segment pass information between their DRP's that links their respective ring-configured channels together. Specifically, a module attaches a link header (also referred to herein as a "tag") to each data packet that it sends out on its DRP. The tag indicates to a receiving module residing in a second ring-configured channel which port of the module in the first ring-configured channel received the packet and which direction the packet is traveling. Responsively, the module receiving a data packet with a link tag only transmits the packet downstream from the remaining ports. For example, if a first ring (channel 1) communication module receives a data packet on fiber port B, it sends the data packet with a link tag over the inter-ring channel to the second ring (channel 2) communication module on the same transmission segment, wherein the tag indicates that the channel 1 module received the packet on fiber port B. Consequently, the channel 2 module responsively transmits the data packet downstream out its other ports, i.e., fiber port A and port C, which is the peripheral device port.

Unlike the single-ring communication system disclosed in the above referenced, related patent application, the present, dual-ring system must distinguish between transmit and receive faults at each communication module in order to direct data packets around broken fiber segments that may exist between communication modules. In this regard, the DRP's also pass fault detection information between rings by way of a status code.

In one embodiment of the invention, this status code is passed on electronic communication lines separate from the electronic lines upon which data is communicated, but all four electronic lines are part of the inter-ring channel. In another embodiment, this status code is passed as a carrier signal between data packets on the inter-ring channel. In another embodiment of the invention, the inter-ring channel may be a fiber optic channel.

When a first module of a set residing at a transmission segment detects a communication fault, the module can notify the second module in the same set via the inter-ring channel, and the notification can include an indication whether the fault is detected by port-A or by port-B of the first module and whether it is a transmit or a receive fault.

Note that a module can directly detect only receive faults, i.e., failure to sense light or to receive a status carrier code, e.g., a coded pattern that the module should repeatedly receive on the fiber ports at a constant interval between data packets and even if no data packets are transmitted to the module. However, according to a feature of an embodiment of the present invention, a module indirectly detects a transmit fault arising from its own transmitter or from a break in communication between its own transmitter and an immediately adjacent module downstream of the transmitter.

This is done, in an embodiment of the present invention, by a receiver of a module detecting a receive failure, where the module is immediately adjacent and downstream of a first module on the transmitter and the failure arises from the first module's transmitter or from a break between the two modules. Then the second module, i.e., the module detecting the receive failure, sends the first module a transmit fault code in a fiber status carrier between data packets. Responsive to receiving the transmit fault notice, the first module notifies a third module that resides at the first module's same transmission segment about the transmit fault via their inter-ring channel. The code indicates to the third module the port that has failed and the type of fault that was detected. For example, if the transmit failure described in the above example is on port A of the first module, the first module notifies the third module that the port that failed is port A and that the type of failure is a transmit failure.

The related patent application describes a block method for deactivating a fiber link between two adjacent modules responsive to a broken fiber and describes a break method for activating a virtual link responsive to detecting disruption of a communication path. In another feature of the present invention, the modules in a ring-configured channel deactivate a fiber link between two adjacent modules responsive to a broken fiber, but do not automatically activate their virtual link simply responsive to detecting disruption of a single communication path in the ring. This is because in the arrangement of the present invention, in which modules of ring-configured dual channels also have inter-ring channels and signaling as described herein, a missing packet due to a broken path of one of the dual channels is automatically provided from the other communication channel. However, for a situation in which respective transmit paths or respective receive paths are broken on both the channel-1 and channel-2 modules of the same set, the channel-1 and 2 master modules of work together simultaneously to activate both their virtual links at the same time. The master modules do this by the break code system and method described herein and in the related patent application.

The above described arrangement is advantageous because it uses a single master module to control a single communication ring. Also, due to operation of the inter-ring channel for data communication in addition to fault communication, and due to the particular fault information that is communicated, the dual-ring network of the disclosed arrangement tolerates more communication path failures.

Since RRC has two fiber rings and URC has one, RRC has double the amount of hardware. That is, RRC network nodes have two ring communication modules at each data input and output point of the fiber rings. Since two such ring modules are in close proximity to each other at every node (i.e., data I/O point), the present invention takes advantage of this by providing an inter-ring communication channel between the two communication modules at each node. RRC communication module 110, shown in FIG. 1 herein, is similar to the communication module shown in FIG. 1A of the related patent application. However, communication module 110 herein has an additional port referred to as a dual ring port ("DRP"), which is used to connect the two ControlNet communication channels together.

Figure 1:
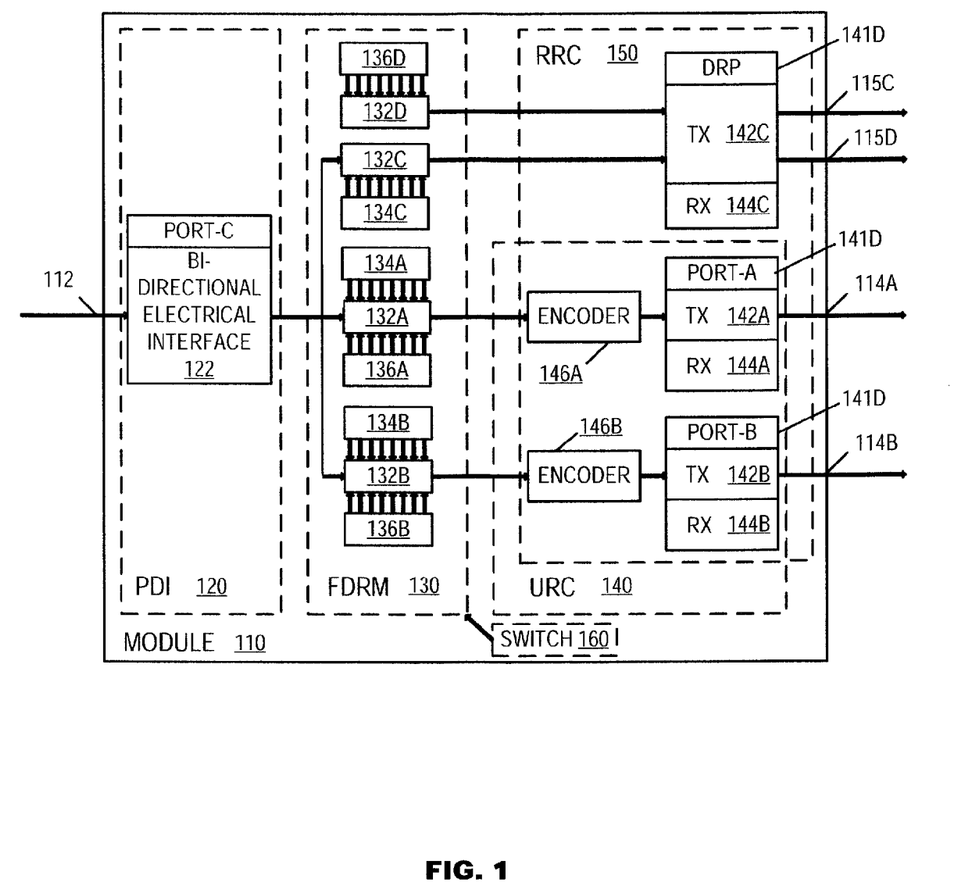
FIG. 1 illustrates a communication module (also referred to as a "Weed media module") according to an embodiment of the invention, where the module is receiving a data packet at an electrical network input of the module and sending to optical outputs of the module to a optical fiber ring.

Also shown in FIG. 1 is a data packet being received from a host network at electrical interface port 122. In a manner like the URC module of the related patent application, RRC module 110 sends this received packet in both directions of the fiber ring to which module 110 is connected via ports A and B. However, RRC module 110 also sends this same packet out DRP to a companion RRC module that is in the same node, but connected to the other fiber ring.

Figure 2:
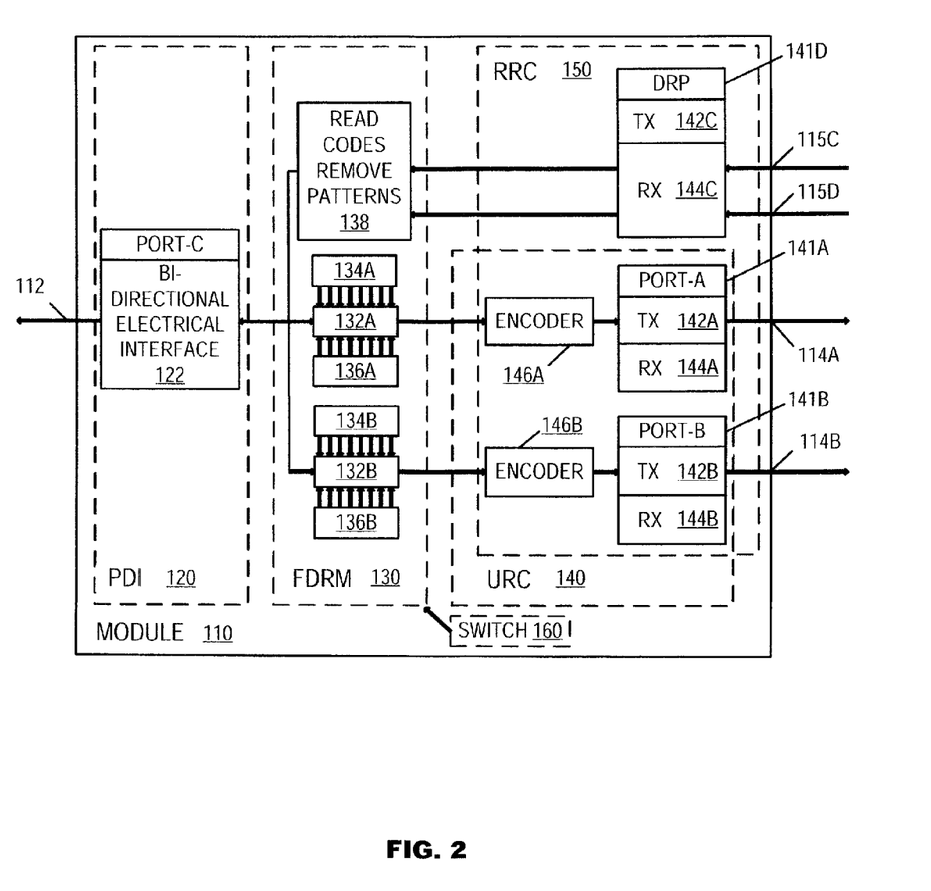
FIG. 2 illustrates the arrangement of FIG. 1, wherein the module is receiving a data stream at one optical input and sending a packet from the data stream to the electrical network and the other optical fiber output, according to an embodiment of the present invention.

FIG. 2 shows the flow of data when a DRP receives data. In particular, FIG. 2 shows that RRC module 110 transmits the data packet received by the DRP out its remaining ports, i.e., peripheral port 122 and the two fiber ports A and B. However, when a duplicate packet is received from the other ring by DRP, module 110 does not retransmit this data packet at all if this packet has already been received by one of the fiber ports from another ring module. This ensures that the duplicate packet is never used unless the original packet for that ring has not arrived at a fiber port. This may occur, for example, when the fiber ring has been broken.

For a ControlNet dual-channel network, communication modules on the same node transmit duplicate packets on the respective ring-configured channels at the same time. Consequently, in an application of the present invention to such a ControlNet network, if all the fiber is intact, the packets will be received at the communication modules of the next node in the rings at their fiber ports prior to being received from one another via their inter-ring channel, since there is inherently a slightly longer delay to pass packets from one ring to the next using the inter-ring channel. Nevertheless, each RRC module waits 400 ns before transmitting from its DRP to ensure the fiber port has enough time to receive the data packet from the fiber ring.

Adding a new communication channel between the two rings is extremely complex and can be difficult to manage. The amount of status information exchanged in a two ring network becomes too great to be simply passed between modules as a packet header. Due to this increase of status information required to manage break/heal operations, separate bi-directional status and data lines are used for the inter-ring channel.

As stated before, ControlNet dual-channel system transmits identical packets on both ring-configured communication channels and, each node must receive these duplicate packets on both channels within 1.6 μs of each other. To manage this added communication channel and coordinate the duplicate packets continually entering and leaving two separate rings, RRC modules have logic that controls proper sharing of data packets between these two rings. In particular, referring to FIG. 3, each fiber port (312A; 312B) of an RRC module uses an extended break code (313A; 313B) having two bits, as opposed to the 1-bit code used by URC modules. Further, the DRP adds two important lines of communication, a) fiber status information of each ring to the other (see Dual Ring Status herein below for more information), and b) a duplicate data packet+a directional code to allow data to pass from one ring into the other (see Link Code herein below for additional information). The status/data lines and codes are essential in tracking where a break is located in the opposite ring. The 'Link Header' or tag is very important when borrowing a duplicate packet from the opposite ring in order to properly route it to the appropriate downstream nodes.

Figure 4:
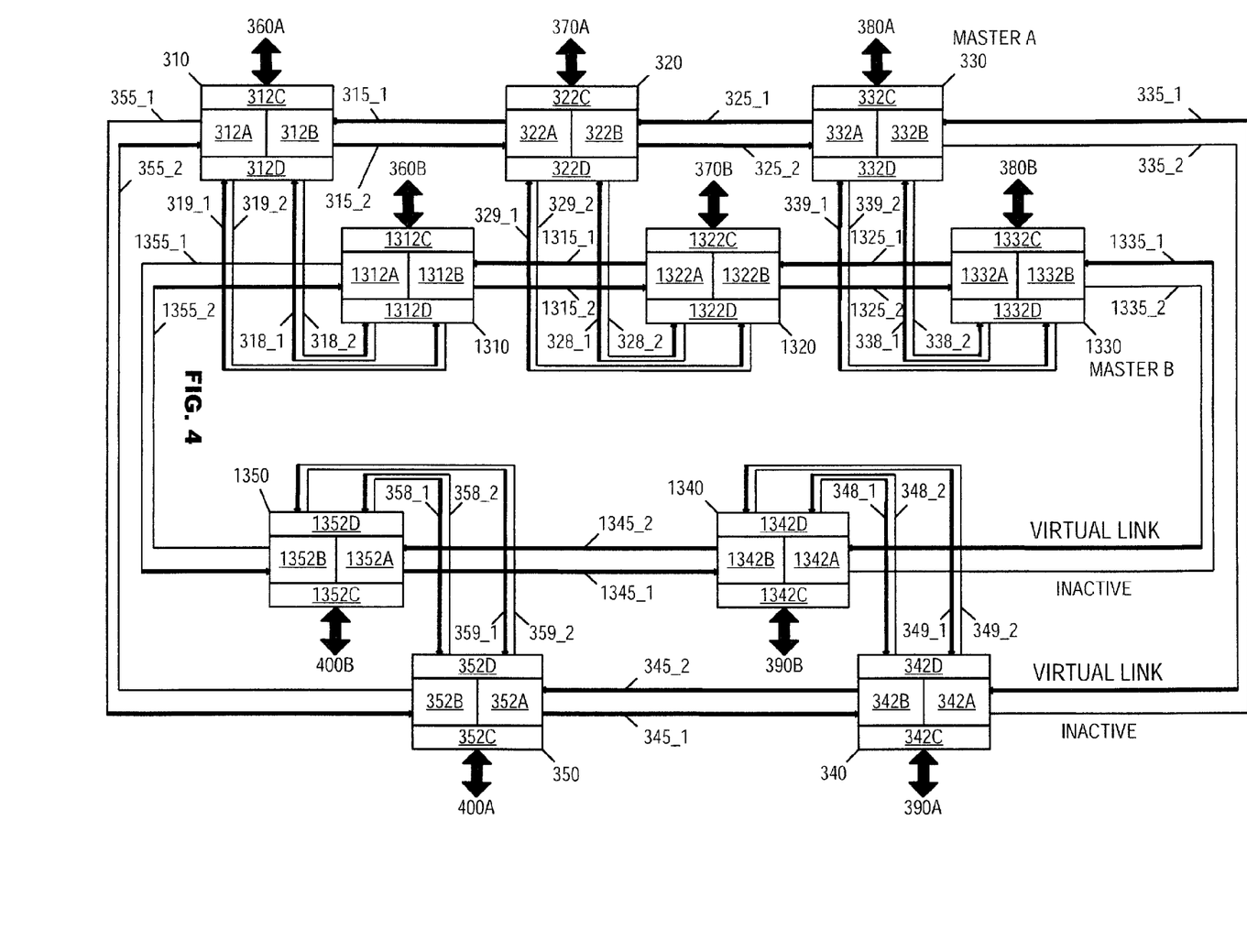
FIG. 4 illustrates ring communication between modules in an intact ring, according to an embodiment of the invention.

When using RRC modules to form two rings, as shown in FIG. 4, then there are two 'Master' RRC modules (330; 1330) and two virtual links formed by fibers 335_1 and 335_2 for ring 301 and by fibers 1335_1 and 1335_2 for ring 302. RRC modules 310, 320, 330, 340, 350, 1310, 1320, 1330, 1340, and 1350 of rings 301 and 302 cooperate to control the virtual links for the two rings in a similar fashion as the URC modules described in the related patent application for a single ring, i.e., using fault management codes in the packet tags and the fiber status carrier. However, the two virtual links are not controlled independently of each other. The RRC modules must activate and deactivate the virtual links together in the present, dual-ring system.

Because the RRC modules of a node must receive identical packets on their respective rings within 1.6 μs of one another, corresponding fiber segments in the two rings must be approximately the same length. As an example, fiber segments 335_1 and 335_2 must each be close to the same length as each of segments 1335_1 and 1335_2. By keeping all these segments equal in length, the timing between nodes is equal, regardless of whether using ring 301 or ring 302. Due to this limitation in network design, the virtual links are not used unless ring 301 and ring 302 are both broken in the same segment at the same time. Example: a break in 345_1 or 345_2 at the same time as a break at 1345_1 or 1345_2.

When a fiber is broken, appropriate ones of RRC modules 310, 320, 330, 340, 350, 1310, 1320, 1330, 1340, and 1350 may cooperate to deactivate this fiber segment using block tags, as described for URC in the related patent application. However, with the RRC arrangement of the present invention, it may not be necessary to activate a virtual link to complete a communication path to all nodes, since the RRC modules at a node, e.g., modules 310 and 1310, modules 320 and 1320, etc., pass duplicate packets to one another via their inter-ring channels.

FIG. 4 provides an example of data flow in a dual-ring network. For this example, duplicate packets enter the fiber rings at connection points 360A and 360B from a peripheral device on a host network. Each module (310; 1310) in turn retransmits the packets out into their respective fiber rings 301 and 302. Module 310 is connected to fiber ring 301 by fiber ports 312A and 312B and module 1310 is connected to fiber ring 302 by fiber ports 1312A and 1312B.

These two 'twin' modules (310; 1310) also pass this packet to the opposite ring via their dual-ring ports (312D; 1312D) on respective two data links (318_1; 318_2). Both of these packets are tagged with a code to inform the partner module that this packet originated at the electrical port (312C; 1312C). Since this example network has no fiber faults, these duplicate packets received at the DRP's from the other rings are not needed. Consequently, they are ignored or discarded by each module.

Now both modules (310; 1310) have sent their packets into the fiber ring in two directions, the ring 301 module (310) transmitting from port-A (312A) on fiber 355_1 and from port-B (312B) on fiber 315_2. Similarly, the ring 302 module (1310) transmits from port-A (1312A) on fiber 1355_1 and from port-B (1312B) on fiber 1315_2.

Following these duplicate packets around rings 301 and 302 counter-clockwise, they next reach adjacent modules 350 and 1350, i.e., in ring 301 module 350 at the receiver of port-B (352B) and in ring 302 module 1350 at the receiver of port-B (1352B). These packets are transmitted with attached tags in the same manner as described in the related patent application. In this case, each tag carries an unblock code and is proceeded and followed by continuous fiber status carrier codes, which in this example are 'heal codes'.

These two modules 350 and 1350 retransmit their respective incoming packets from port-A (352A; 1352A) to continue along the fiber. The modules also send the duplicate packets to the electrical interfaces (352C; 1352C) of the respective modules 350 and 1350 and out of the rings 301 and 302 to the next peripheral devices at connection points on a host network (400A; 400B). Modules 350 and 1350 also transmit the packets across to the respectively opposite rings 302 and 301 via the DRP's 352D and 1352D of the respective modules, just as did modules 310 and 1310, so that module 1350 receives a duplicate packet via the inter-ring channel from module 350 and module 350 receives one via the inter-ring channel from module 1350. Modules 350 and 1350 temporarily hold the packets they receive across the inter-ring channel in this manner for use in case of a fiber break. In this example, rings 301 and 302 are intact, so modules 350 and 1350 discard the duplicate packets received via the inter-ring channel. The packets continue to move around the rings in this fashion until they reach the virtual links in their respective rings, where they are then stopped (blocked), in the same manner as described in the URC arrangement disclosed in the related patent application.

Link Code

It is fairly simple for a ring module to understand upstream from downstream in a single ring configuration. A data packet is received from an upstream device, thus all retransmission of this message is performed downstream by the remaining ports. However, when a duplicate packet is received on the DRP from the opposite ring, the receiving module must have a way to tell it which direction is downstream. In an embodiment of the present invention, this function is performed by a link code and a 'Link Tag'.

Figure 3:
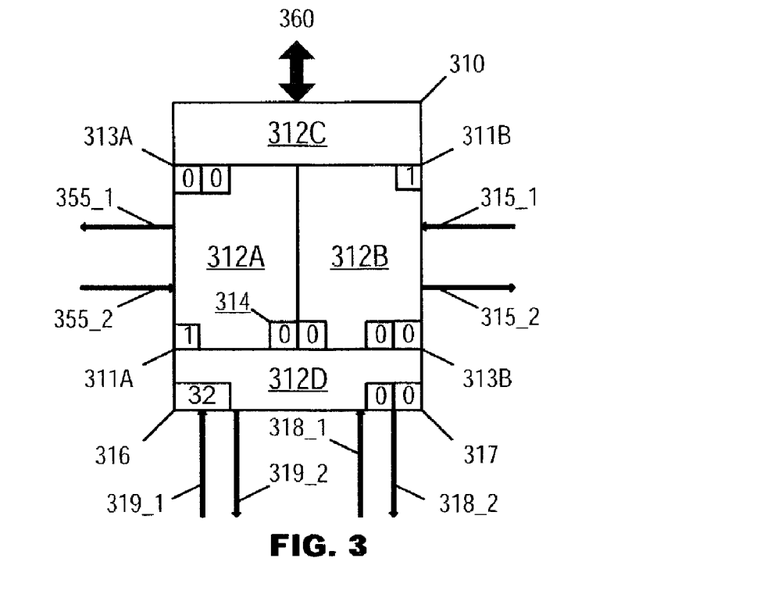
FIG. 3 illustrates a redundant ring communication module, according to an embodiment of the invention.

Referring now to FIGS. 3 and 4 together, link code 317 shown in FIG. 3 is a two bit code that is sent to module 1310 via inter-ring channel 318_2 by module partner 310 (also referred to as "twin" module), which is in the same node but connected to the opposite ring, (To keep confusion to a minimum, modules joined together by an inter-ring channel between their DRP's are called "twin" or "partner" modules, not "adjacent" modules.) This two bit code 317 is derived from the fiber port 312A or B that received this data packet. When transmitting the data packet to the opposite ring, DRP (312D) places a code in a tag or eight bit header which is shifted into the data stream and transmitted to twin module 1310 in the other ring 302. This is because they are both located at the same ControlNet node and are transmitting and receiving duplicates of the same data packet (one for the channel of ring 301 and one for the channel of ring 302).

Also shown in FIG. 3, upon receiving this duplicate packet via line 318_1 of their inter-ring channel, the DRP (312D) of module 310 first checks to see if the message was received on another of its own ports. If it was, module 310 discards this duplicate packet. If the packet was not received by another of its own ports, the duplicate message is needed and thus module 310 sends the packet to all its other ports for retransmission, except for the port identified by the tag (link code).

Figure 5:
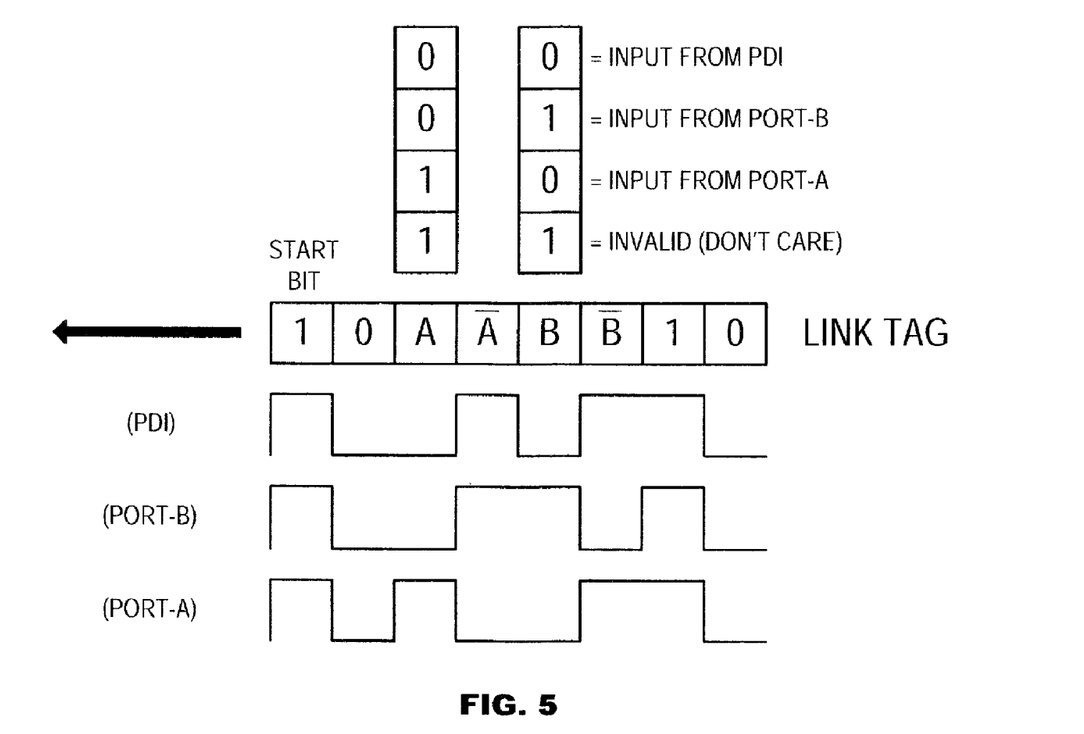
FIG. 5 illustrates a link tag, according to an embodiment of the invention.

Referring now to FIG. 5, link codes "00," "01," and "10" are illustrated according to an embodiment of the present invention. The link code in the tag is required in a dual-channel network to ensure downstream multicasting. The port identified in the tag is the port that received the upstream message in the opposite ring. To keep the data packet flowing in the correct direction, this port is excluded for this packet transmission If, for example, the link code is "10" for a data packet received via an inter-ring channel, this indicates the packet was originally received on port A of the module that sent the packet out its DRP. Consequently, if the module that receives the duplicate packet via the inter-ring channel transmits the packet, it transmits out its own port-C and port-B, but not port-A.

Extended Break Code

In some respects a break code as described in the related patent application is still used in the dual-ring topology of the present invention; however, FDRM 130 of FIG. 1 herein must collect additional break management information in order to take appropriate action for whole network 300 of FIG. 3 herein. The two state (1-bit) break bit of URC cannot pass enough information to support a second ring for RRC. Adding another bit to create a 2-bit code allows another needed state to be shared and tracked.

Figure 6:
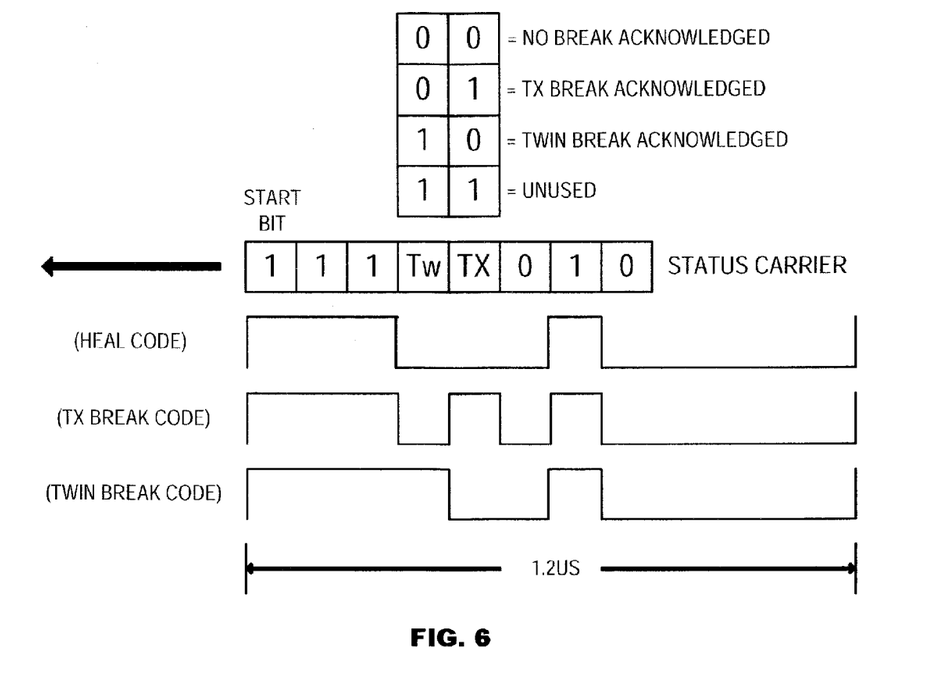
FIG. 6 illustrates a status carrier, according to an embodiment of the invention.

Referring to FIG. 6, extended break codes "00," "01," and "10" are illustrated according to an embodiment of the present invention. See also FIG. 3 (extended break codes 313A and 313B). As with the single-bit break codes of URC, the extended break codes of the present RRC arrangement are selectively shifted by each fiber port into the fiber data stream in the form of the fiber status carrier. The extended break codes allow one module to not only identify a broken fiber by loss-of-transmission, but to also inform another, adjacent module that the one module is no longer receiving data from the adjacent module's fiber transmit port. The "01" transmit break ('TX break') indicates loss-of-transmission in a similar way as the 'block code' of the tag header. [These are not all that similar. One is used in the block method (both rings) the other in the break method (dual-ring only).] Both these codes are sent to the adjacent module in response to loss-of-light or a broken fiber. Receiving this information from an adjacent module allows the receiving module to understand there is a fiber break on its transmit fiber and to then share this information with the other ring via the DRP. Refer to the Dual Ring Status Code section for more information on sharing status information between rings Note that the twin break code ("10" shown in FIG. 6 here) and the break code disclosed in the related patent application are the same code. This allows a master module to use the same code to change the status of the virtual link, while passing additional information in a second bit.

Dual Ring Status Code

A single-ring break management arrangement for sending a break/heal code in the fiber status carrier is disclosed in the related patent application. This arrangement works well in both fiber rings (ring 301; ring 302) and is used in an embodiment of the present invention to manage fiber status in each individual ring. However, in the dual-ring arrangement of the present embodiment there are now 5-states that must be shared and tracked between each ring in order for the RRC modules to determine the direction in which a broken fiber might reside in either ring and to route data packets correctly to all ControlNet nodes. To support the communication of this status break/heal information between rings, the inter-ring channel has a status link (FIG. 3, 319_1 and 319_2). The method of transmitting this information in a fiber status carrier during idle time between data packets using the data lines is not used by the DRP.

Figure 7:
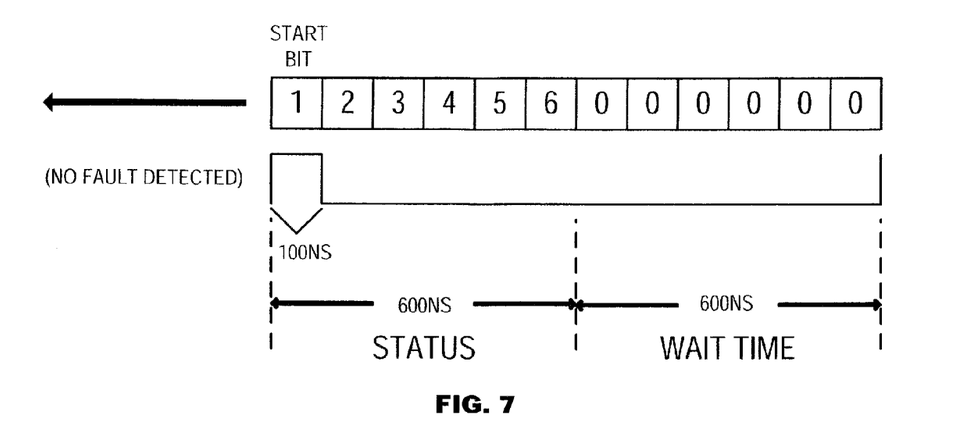
FIG. 7 illustrates a dual ring status code, according to an embodiment of the invention.

For dual-ring status, FDRM 130 (FIG. 1) of each module sends a 5-bit 'Dual Ring Status Code' on the inter-ring channel, as shown in FIG. 7. In four of the five bits, FDRM 130 signals the status of the four fibers (one for each transmit and receive) connected to its ring module. The fifth bit is a global status bit as shown in Table 1, as follows.

TABLE 1

| Bit | Description | No Fault | Fault |
|---|---|---|---|
| 1 | Start bit. Always a "1" when signal is present. | 1 | 1 |
| 2 | Fiber Port-A receiver detected that no light is present. | 1 | 0 |
| 3 | Fiber Port-B receiver detected that no light is present. | 1 | 0 |
| 4 | Fiber Port-A transmitter fault in Fiber Status Carrier. | 1 | 0 |
| 5 | Fiber Port-B transmitter fault in Fiber Status Carrier. | 1 | 0 |
| 6 | Global Alarm condition in opposite ring. | 1 | 0 |

The dual ring status code is always lead by a logic-high value that signifies the beginning of the status carrier. Bit-1 is then followed by a five loons bits which make up the rest of the status message being transferred. This transmission is then followed by a wait time of 600 ns (six 100 ns logic-lows). If the inter-ring channel is intact, the signal will occur on a 1.5 μs interval. The DRP will continue to scan for 10 μs if this status signal is not received. If the status signal is not received after this interval, then the DRP will initiate a "Link Alarm" to alert the user of this failure.

Ring Register in a Dual-Ring

Ring register 314 (FIG. 3), is described in the single-ring arrangement of the related patent application and is also used in the dual-ring arrangement of an embodiment of the present invention. However, in the present embodiment, the status of the other ring must also be considered before sending a 'break code' to the master module. In the single-ring arrangement, when a break is identified by a fiber port, logic of the port sets the register accordingly. The resulting register value immediately signals the other fiber port in the module to transmit the 'break code' in the fiber status carrier. However, in the present, dual-ring arrangement, the setting of the ring register is mainly used to identify what is referred to herein as a "receive break" on that port. For instance, if it is port-A that sets a break in ring register, this information must first be compared to the information in the dual-ring status code from the DRP before sending a break code to the master module. If the DRP has no port-A failure set, then port-B will continue to send out a 'heal' code. If however, the dual-ring register has a port-A failure from the other ring set, this match with the already identified port-A break signals port-B to send a 'Twin Break' code to alert the master module.

In a the present, dual-ring arrangement, when a module receives the fiber status carrier and reads the code, ring register setting logic may or may not respond in the same way as does logic in the single-ring arrangement. If the code received is a 'TX break,' ring register logic will not respond, since it is not necessary to send this information to the master. Dual-ring status code logic will, however, respond to this type of break code by setting a transmit break indicating the whichever fiber port is broken. However, if the code received is a 'Twin break' ring register logic will respond in the same way as the single-ring module (as described in the related patent application), since this code must get to the master to change the state of the virtual link.

Extended Break Management

Figure 8:
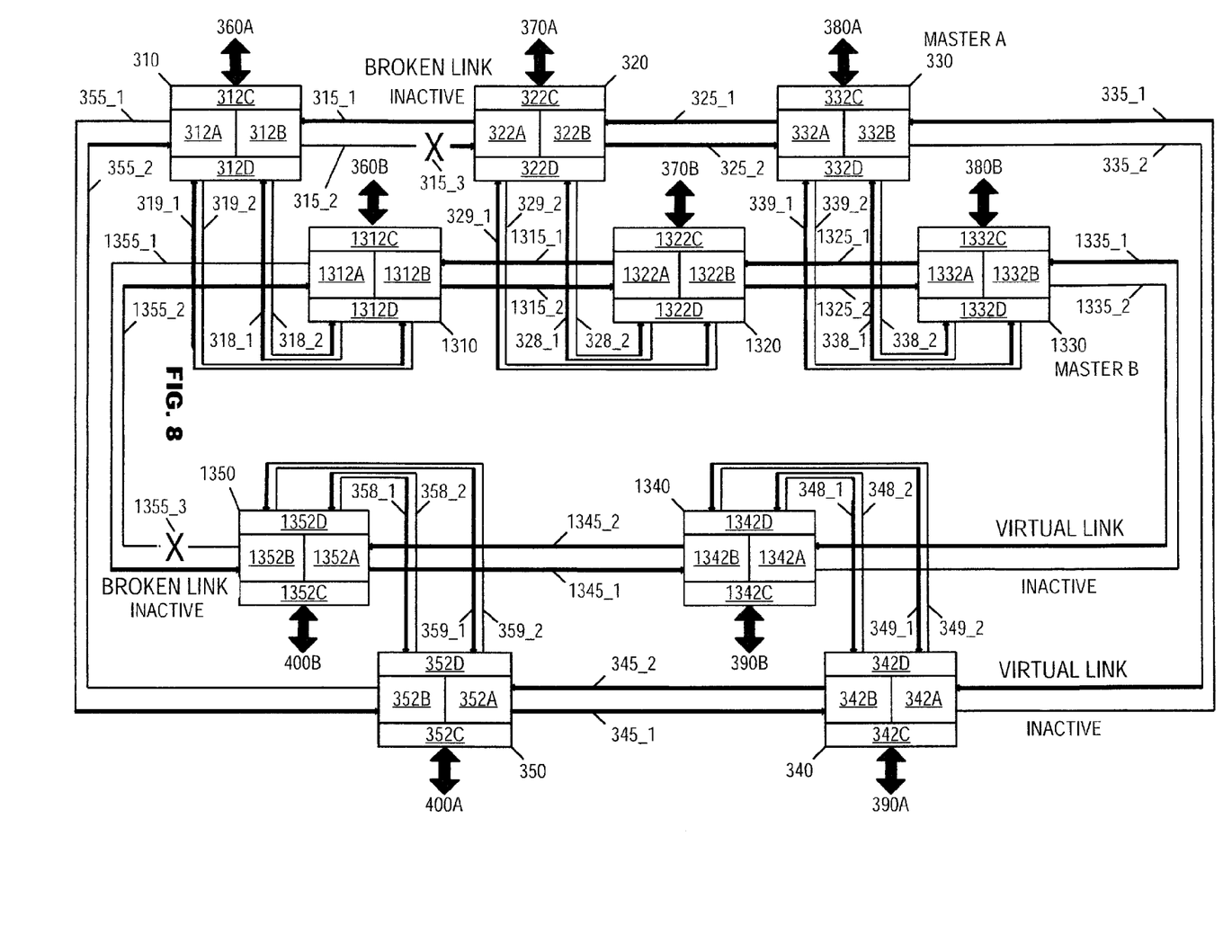
FIG. 8 illustrates ring communication between modules where there are breaks in two ring paths, according to an embodiment of the invention.

By providing the extended break code, the DRP, and a link code and a dual-ring status code, this enables the RRC modules to manage data flow around multiple breaks in a dual-ring (dual-channel) system. As is shown in the example of FIG. 8, the DRP particularly helps RRC modules to handle fiber breaks quite well without the modules having to activate the virtual link.

This example illustrates breaks in two fibers (315_3; 1355_3). This type of break is rare, but illustrates how a dual-channel ring using inter-ring communication can easily provide greater network reliability. This example would be considered a simple case, but illustrates that even if two separated fibers should break in the network at the same time, FDRM 130 can properly manage the data flow.

As with the single-ring arrangement of the related patent application, in the present embodiment of the invention the receiver on a broken fiber is the first to identify a problem. The receiver does this by detecting the loss-of-transmission no longer traveling down the fiber. Both modules 320 and 1310 are on the receive end of the fiber so they both acknowledge the two breaks in the fiber. The modules responsively set their respective ring registers to '10,' since both modules have a loss-of-transmission on port-A. Instead of sending a break code in the fiber status carrier from port-B (as is the case with the single-ring arrangement of the related application), the dual ring module first compares this detected fault with any faults reported by the dual-ring status carrier of the DRP.

Module 320 compares the port-A fiber break state with the settings of dual-ring status code from the DRP (322D) and finds that the ring 302 module (1320) reports no faults from ring 302 in the dual ring status (329_1). The fiber defects in both rings are not on the same port, so a 'twin break' code is not sent. However, port-A (322A) is still responsive to loss-of-transmission at the receiver and sets the extended break code to '01,' i.e., a 'Transmit Break,' which is sent from port 322A in the fiber status carrier (315_1). Module 310 understands that this new code is not intended to alert the master, and therefore does not change the ring register nor send the code on to the adjacent module (350). The 'heal code' continues to be sent from fiber port-A (355_1). The FDRM 130 responds to the Transmit Break from port 322A by setting the dual-ring status code for a transmit break on port-B and sends this code out on the status line (319_2).

Module 1310 also compares fiber port break results with the dual-ring status register of the DRP to find that ring 301 module (310) reports a 'TX break' on port-B, as just stated. This also does not match, since one break is reported on port-A and the other is reported on port-B. The ports must match before a module will send out the twin break code for the 'Master' to activate the virtual link.

As in the previous dual-ring example (FIG. 4), the present example starts by following the data flow of the duplicate packets entering the ring at modules 310 and 1310 (360A; 360B). The identical packets entering from the two PDI's (312C; 1312C) are delivered to the fiber ports of both modules. Module 1310 transmits the data packet from port-B on fiber 1315_2 and from port-A on fiber 1355_1. With port-A (1312A) detecting loss-of-transmission, the data packet is tagged with a block code. Combining the broken fiber (1355_2) and the loss-of-transmission detected (1355_1) at port-A (1312A) results in deactivating the communication link between modules 1310 and 1350 of ring 302. No break on port-B (1312B), thus no block code.

Module 310 transmits the data packet from port-A on fiber 355_1 and from port-B on fiber 315_2. Both packets are tagged with unblock codes. Even though the 'TX break' code has been received from module 320, signifying that a fiber is broken, port-B will continue to send data packets. There is a deactivated communication link here in ring 301 as well; created by the block code received at port-B (312B) and the loss-of-transmission detected at port-A (322A) resulting in a deactivating communication link between modules 310 and 320.

Since the fiber 315_2 is broken, module 320 has not received the data packet to share with the peripheral (e.g., ControlNet) device(s) connected at this node (370A). However, a duplicate packet passing from module 1310 to 1320 is received on the dual link port at connection 328_1. Module 320's DRP (322D) reads the tag of the link header to identify this is data from port-A in ring 302. Since module 320 did not receive a data packet it forwards this packet downstream to port-B to be shared with the other ring 301 modules and to the PDI (322C) for the peripheral device(s) at this node (370A), but not on port-A (as tagged) in the upstream direction.

Similarly, data packets are received at modules 350 and 1350 from peripheral devices connected here (400A; 400B). The fiber break 1355_3 prohibits the data packet from getting to module 1310 from module 1350 on ring 302. Instead this data packet gets to module 1310 via connection 318_2 with a 'port-A' link tag attached to the data packet from module 310. This identifies it as being received by port-A and thus the correct packet to be sent to peripheral devices connected here (360B), just the same as if it had been received on port-A (1312A).

When these broken fibers are repaired (315_2; 1355_2), the receive ports (322A; 1312A) again detect the light traveling over the fiber. These ports will immediately start receiving data packets, but the repaired ports will wait 2 seconds before sharing any new packets. All data packets received during this time frame will be discarded (blocked). This technique allows any latent data packets time to clear out of the fiber rings before using this suspect data.

The modules on these repaired fibers (320; 1310) will also change the codes being sent in the packet tags and the status carriers and the rings will return to normal dual-ring operation as shown in FIG. 4.

As was previously mentioned, all dual-channel ControlNet nodes are constrained to only allowing 1.6 μs between receiving identical packets on both rings 301 and 302. The ControlNet protocol requires that the length of the fiber between two nodes on ring 301 must be approximately the same length on ring 302 for the same two nodes (to guarantee 1.6 μs). Referring to FIG. 4, if fibers 315_1 and 315_2 connecting modules 310 to 320, are two kilometers long, for example, then fiber 1315_1 and 1315_2 connecting modules 1310 and 1320 must be two kilometers long as well. However, fiber segment between different nodes can have other lengths. Such as fiber 355_1 and 355_2 connecting modules 310 and 350 can be four kilometers in length. This is twice as long as the fiber segment between modules 310 and 320, but still will work as long as ControlNet rules are followed and 1355_1 and 1355_2 for ring 302 are also four kilometers long. Ring 301 must be an exact copy (within 1.6 μs) or twin of ring 302. Due to these varying fiber lengths between nodes, when a fiber break occurs in the same segment of both rings there is no way to guarantee that both packets (A and B) will arrive in 1.6 μs unless the virtual links in both rings respond at the same time.

Figure 9:
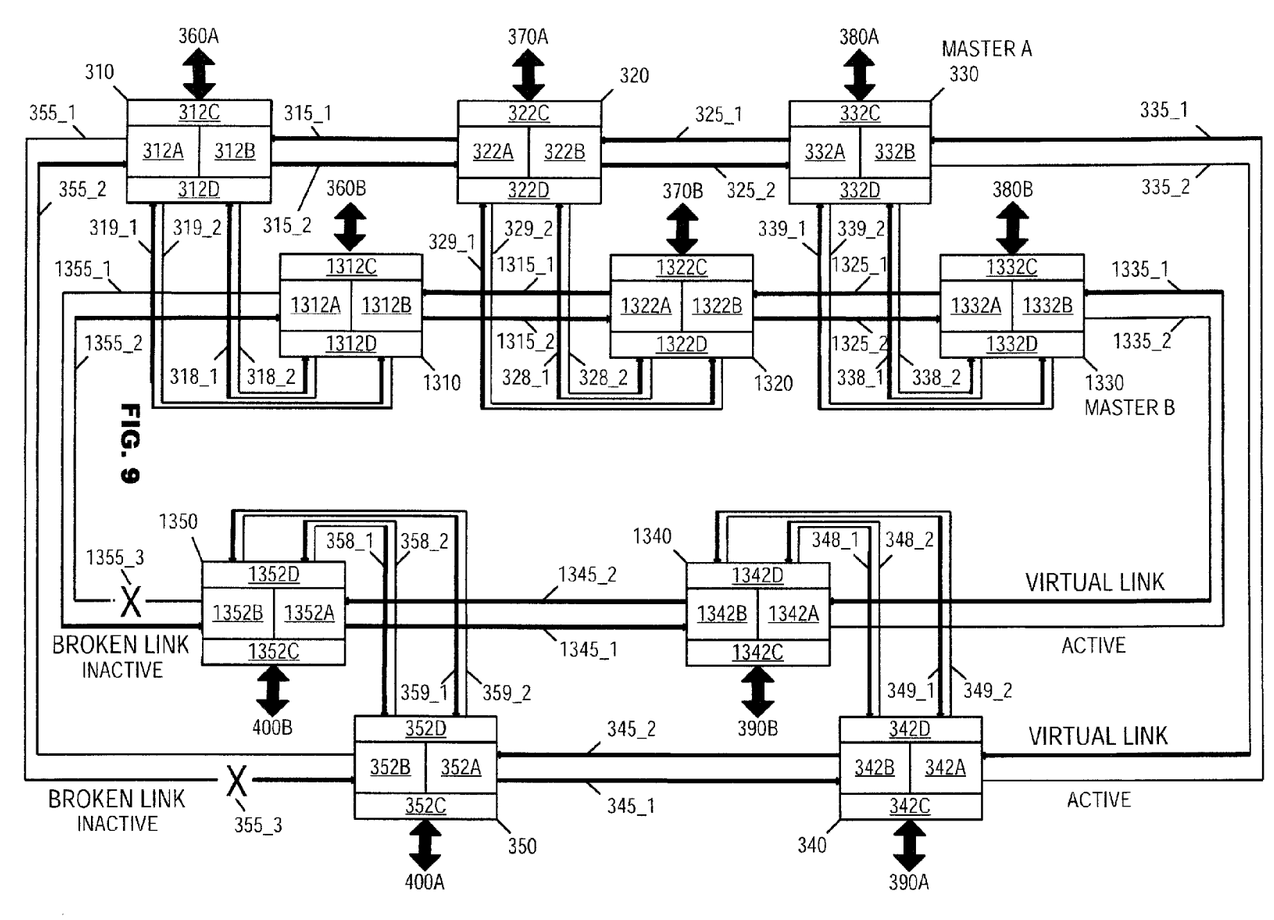
FIG. 9 illustrates ring communication between modules where there are twin breaks, i.e., breaks in the same segment in both rings, according to an embodiment of the invention.

Referring now to FIG. 9, an example of a 'twin break' is illustrated, according to an embodiment of the present invention. The word "twin" is used since the break has occurred in the same fiber segment in both rings and affects both modules of a given node (twin modules). In the present dual-ring embodiment of the invention, the twin break is the only type of break that will change the state of the two 'virtual links' in both rings.

Two separate fiber breaks are illustrated, namely a break at 355_3 and another at 1355_3. This causes a loss-of-transmission to be detected at both module 350 port-B (352B) in ring 301 and module 1310 port-A (1312A) in ring 302, setting off a chain of fault management events, wherein modules respond as follows.

A) Both modules (350; 1310) set their ring registers, where module 350 sets its ring register to a '01' for a port-B break, and module 1310 sets its ring register to a '10' for a ring 301 break. (See related application, FIG. 3F (314).)

B) Both affected fiber ports (352B; 1312A) begin sending block codes '0' (related application, FIG. 4) in the tag of all transmitted data packets (355_2; 1355_1).

C) Loss-of-transmission for both fiber ports (352B; 1312A) sets the extended break code to '01,' prompting the transmission of the transmit break ('TX break') codes (355_2; 1355_1) in the status carrier to the corresponding adjacent modules (310; 1350).

D) The FDRM of these modules also set their dual-ring status codes for the appropriate break type, resulting in fault codes being sent in the status carrier to the opposite ring (Table 1). Specifically, module 350 sends the code for a 'receive fault on port-B' (359_2) and module 1310 sends the code for a 'receive fault on port-A' (319_1).

Now continuing to follow in FIG. 9, the fiber modules (310; 1350) receiving the above described codes respond by doing the following:

The received block codes attached to the tag of all incoming data packets activates the discarding (blocking) of these packets at ports 312A and 1352B. This along with the broken fiber creates an inactive fiber communication link between modules on ring 301 (310; 350) and ring 302 (1310; 1350).

The 'TX break' code in the fiber status carrier received at port-A (312A) and port-B (1352B) sets dual-ring status codes of each module (310; 1350) for the correct break type. Specifically, module 310 sends the code for a 'transmit fault on port-A' (319_2) and module 1350 sends the code for a 'transmit fault on port_B' (359_1).

When the original modules (350; 1310), the ones detecting loss-of-transmission, receive the transmit faults in the dual ring status code, they react as follows:

E) The dual-ring status code received by module 350 is compared to the ring register. The break has not been removed (355_3), so the loss-of transmission signifies to module 350 that there is a break on the receiver of fiber port-B and the dual-ring status code indicates to module 350 that module 1350 has identified a 'transmit fault on port_B. Responsive to determining this match of fiber ports, modules 350 and 1350 set their ring registers to '01,' prompting them to send out the 'twin break' code '10' fiber port-A (352A; 1352A) in the fiber status carrier (345_1; 1345_1).

F) The dual-ring status code received by module 1310 is again compared by module 1310 to the ring register. The break has not been removed (1355_3) so the ring register signifies to module 1310 that there is a break on the receiver of fiber port-A and the dual-ring status code indicates to module 1310 that module 310 identified a transmit fault on port_A. Responsive to this match of fiber ports, modules 1310 and 310 set the extended break code of fiber port-B (1312; 312) to '10' and sends out the 'twin break' code in the fiber status carrier (1315_2; 315_2).

When the adjacent modules (340/1340; 320/1320) receive the 'twin break' code they respond as follows:

G) Responsive to the received twin break codes, receiving modules 340 and 1340 set their ring registers to '01' to signify an incoming fault on port-B (342B/1342B) and receiving modules 320 and 1320 set their ring registers to '10' to recognize an incoming fault on port-A (322A/1322A).

H) Modules 1340 and 1320 send twin break codes on their respective fibers 1335_1 and 1325_2 for ring 302 responsive to their ring registers. Modules 340 and 320 send twin break codes on their respective fibers 335_1 and 325_2 for ring 301 responsive to their ring registers.

With modules 340/1340 and 320/1320 sending 'twin break' codes in the fiber status carrier, the adjacent modules next in the two rings are the master modules 330; 1330. When the 'Masters' receive the 'twin break' code in a dual-ring they respond much in the same way as a single-ring by doing the following:

I) Each master module sets its ring register responsive to the twin break code arriving in the fiber status carrier. Master module 330 receives it's code on fiber port-B (332B) and port-A (332A. Master module 1330 receives it's code on fiber port-A (1332A) and port-B (1332B. The ring register in both masters will be '10' if the twin block code arrives first at port-A and it will be '01' if the twin block code arrives first at port-B. Either condition will activate the virtual link. The twin block codes will eventually arrive at both ports (A & B) so that both ring registers will become '11'.

J) These modules were made 'masters' by an initializing process, such as by setting a switch. Responsive to these switch settings, which indicates to the modules that they are masters, and responsive to their new ring register settings (per item K immediately above), both masters stop blocking data packets on the port-B receiver (332B; 1332B) (virtual link) and begin attaching 'unblock' tags to each packet transmitted over the virtual link (335_2; 1335_2) to the adjacent modules (340; 1340) on the other side of the virtual link. In this manner, the modules have cooperated to activate the virtual link as a usable communication link.

Based on the forgoing, the fibers in the virtual links for ring 301 (335_1; 335_2) and ring 302 (1335_1; 1335_2) using the break method have become active communications links. The fiber links where the block method has been applied in this example for ring 301 (355_1; 355_2) and ring 302 (1355_1; 1355_5) have become inactive communications links.

Similarly, if either one of the fiber breaks illustrated in FIG. 9 are removed (repaired), then again upon comparing the received transmission status to the dual-ring status code, none of the modules (350/1350; 310/1310) would show a match, thus resetting the fault in the ring register and the 'twin break' code being sent would return to a 'heal' code. The repaired fiber segment would return to being an active communication link, and both master modules, upon receiving the 'heal' code again, would deactivate the communication links of the two 'Virtual Links'.

The examples in FIGS. 8 and 9 show how RRC modules cooperate to effectively manage data flow around the fiber breaks.

Miscellaneous Remarks and Other Variations

Processes, ports and registers of the communication modules described herein above may be implemented as programmable gate array logic or in other ways, including application specific integrated circuitry, one or more embedded controllers, etc.

The description of the present embodiment has been presented for purposes of illustration, but is not intended to be exhaustive or to limit the invention to the form disclosed. Many modifications and variations will be apparent to those of ordinary skill in the art. Moreover, the processes of the present invention are capable of being distributed in the form of a computer readable medium of instructions. Such computer readable medium may have a variety of forms. The present invention applies equally regardless of the particular type of signal bearing media actually used to carry out the distribution. Examples of computer readable media include recordable-type media such a floppy disc, a hard disk drive, a RAM, and CD-ROM's.

Figure 10:
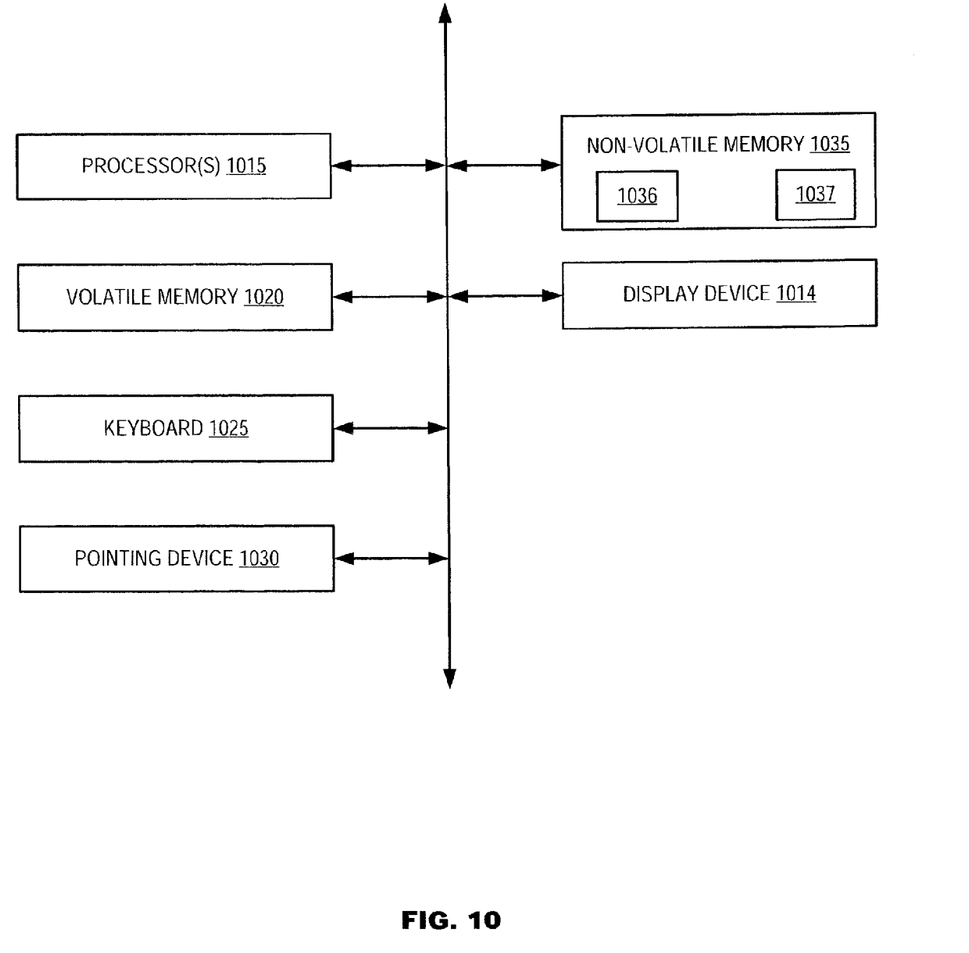
FIG. 10 illustrates a computer system having instructions to implement a method in accordance with an embodiment of the present invention.

Referring now to FIG. 10 an embodiment of the invention is illustrated in which logic for the communication modules described herein takes the form of a computer system 1010. It should be understood that the term "computer system" is intended to encompass any device having a processor that executes instructions from a memory medium, regardless of whether referred to in terms of a microcontroller, personal computer system, mainframe computer system, workstation, server, or in some other terminology. Computer system 1010 includes a processor 1015, a volatile memory 1027, e.g., RAM and a nonvolatile memory 1029, e.g., ROM. Memory 1027 and 1029 store program instructions (also known as a "software program"), which are executable by processor 615, to implement various embodiments of a software program in accordance with the present invention. Processor 1015 and memories 1017 and 1029 are interconnected by bus 640. An input/output adapter (not shown) is also connected to bus 640 to enable information exchange between processor 1015 and other devices or circuitry. System 1010 may also include a keyboard, pointing device, e.g., mouse, nonvolatile memory, e.g., ROM, hard disk, floppy disk, CD-ROM, and DVD, and a display device.

Various embodiments implement the one or more software programs in various ways, including procedure-based techniques, component-based techniques, and/or object-oriented techniques, among others. Specific examples include XML, C, C++ objects, Java and commercial class libraries. Those of ordinary skill in the art will appreciate that the hardware in FIG. 10 may vary depending on the implementation. For example, other peripheral devices may be used in addition to or in place of the hardware depicted in FIG. 10. The depicted example is not meant to imply architectural limitations with respect to the present invention.

The terms "logic," "memory" and "register" are used herein. It should be understood that these terms may also refer to circuitry that is part of a design for an integrated circuit chip, a design for which may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product.

To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention.

For example, in the ring-configured network described herein, transmission paths between communication modules have been described as being optical fiber paths. It should be understood electrical transmission media may be used, such as coaxial cable or even paired conductors, which are generally used for less data throughput, according to conventions that are well-known in the art. Unless clearly and explicitly stated, the claims that follow are not intended to imply any particular sequence of actions. The inclusion of labels, such as a), b), c) etc., for portions of the claims does not, by itself, imply any particular sequence, but rather is merely to facilitate reference to the portions.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A communication system comprising:
    sets of communication modules, each module having i) a pair of ring-channel ports operable to be connected in a ring-configured channel ("ring") in a network, ii) a peripheral device port operable to be connected to a transmission segment for data to and from peripheral devices, and iii) dual ring ports ("DRP's") operable to be connected together providing an inter-ring channel for a set of modules, first and second ones of a set of communication modules being operable to send duplicate data packets on first and second rings, wherein if duplicate data packets arrive via the rings at first and second modules in a next set within a predetermined time interval of one another, each of the modules in a next set transmits its ring-channel received data packet out a ring-channel port, and wherein if one of the duplicate packets arrive at the DRP of a module a predetermined time interval before arriving at a ring-channel port of the module, the module sends the corresponding packet received at the DRP out its other ring-channel port and its peripheral device port.

2. The system of claim 1, wherein the communication modules are further operable to send status information on their inter-ring channels, including a module in the first ring sending a link tag on each data packet sent out on its DRP, wherein the link tag indicates to a receiving module in the second ring which port of the module in the first ring received the packet and which direction the packet is traveling.

3. The system of claim 1, wherein communication modules are further operable to detect communication faults and send fault detection information on their inter-ring channels, in order to direct data packets around broken ring-channel segments that may exist between modules.

4. The system of claim 3, wherein sending a communication fault includes a first module of a set notifying a second module in the same set via the inter-ring channel responsive to the first module detecting a communication fault, wherein the notification includes an indication which of the pair of ring-channel ports of the first module detected the fault.

5. The system of claim 3, wherein communication modules are further operable to distinguish between transmit and receive faults.

6. The system of claim 3, wherein for a failure instance detected by a receiver of a module immediately adjacent and downstream of a first module and the failure arises from the first module's transmitter or from a break between the two modules, the module detecting the failure instance is operable to send the first module a transmit fault code in a status carrier between data packets, and wherein responsive to receiving the transmit fault code, the first module is operable to notify a module in the first module's set about the failure instance via their inter-ring channel.

7. The system of claim 6, wherein a fault code indicates to the module in the first module's set the port that has failed and a type of fault that was detected.

8. The system of claim 7, wherein the modules in a ring-configured channel are configured to automatically deactivate a link between two adjacent modules responsive to a failure, but not automatically activate a link elsewhere in the ring responsive to detecting disruption of only a single communication path in the ring.

9. A method of communicating wherein in sets of communication modules each module has i) a pair of ring-channel ports connected to provide a ring-configured channel ("ring") in a network, ii) a peripheral device port connected to a transmission segment for data to and from peripheral devices, and iii) dual ring ports ("DRP's") connected together in an inter-ring channel for a set of modules, and wherein the method comprises:
    first and second ones of a set of communication modules sending duplicate data packets on first and second rings;
    responsive to duplicate data packets arriving via the rings at first and second modules in a next set within a predetermined time interval of one another, each of the modules in a next set transmitting its ring-channel received data packet out a ring-channel port; and
    responsive to one of the duplicate packets arriving at the DRP of a module a predetermined time interval before arriving at a ring-channel port of the module, the module sending the corresponding packet received at the DRP out its other ring-channel port and its peripheral device port.

10. The method of claim 9, wherein the method comprises:
communication modules sending status information on their inter-ring channels, including a module in the first ring sending a link tag on each data packet sent out on its DRP, wherein the link tag indicates to a receiving module in the second ring which port of the module in the first ring received the packet and which direction the packet is traveling.

11. The method of claim 9, wherein the method comprises:
communication modules detecting communication faults and sending fault detection information on their inter-ring channels, in order to direct data packets around broken ring-channel segments that may exist between modules.

12. The method of claim 11, wherein sending a communication fault includes a first module of a set notifying a second module in the same set via the inter-ring channel responsive to the first module detecting a communication fault, wherein the notification includes an indication which of the pair of ring-channel ports of the first module detected the fault.

13. The method of claim 11, wherein the method comprises:
communication modules distinguishing between transmit and receive faults.

14. The method of claim 11, wherein the method comprises:
detecting a failure instance by a receiver of a module immediately adjacent and downstream of a first module, wherein the failure instance arises from the first module's transmitter or from a break between the two modules;
the module detecting the failure instance sending the first module a transmit fault code in a status carrier between data packets; and
responsive to receiving the transmit fault code, the first module notifying a module in the first module's set about the failure instance via their inter-ring channel.

15. The method of claim 14, wherein a fault code indicates to the module in the first module's set the port that has failed and a type of fault that was detected.

16. The method of claim 15, wherein the method comprises:
the modules in a ring-configured channel automatically deactivating a link between two adjacent modules responsive to a failure, but not automatically activating a link elsewhere in the ring responsive to detecting disruption of only a single communication path in the ring.

17. An apparatus for communicating among communication modules, wherein in sets of the communication modules each module has i) a pair of ring-channel ports connected to provide a ring-configured channel ("ring") in a network, ii) a peripheral device port connected to a transmission segment for data to and from peripheral devices, and iii) dual ring ports ("DRP's") connected together in an inter-ring channel for a set of modules, the apparatus comprising:
a nontransitory computer readable medium having instructions stored thereon for execution by a computer, wherein the instructions, when executed by the computer, cause the computer to implement a method comprising:
first and second ones of a set of communication modules sending duplicate data packets on first and second rings;
responsive to duplicate data packets arriving via the rings at first and second modules in a next set within a predetermined time interval of one another, each of the modules in a next set transmitting its ring-channel received data packet out a ring-channel port; and
responsive to one of the duplicate packets arriving at the DRP of a module a predetermined time interval before arriving at a ring-channel port of the module, the module sending the corresponding packet received at the DRP out its other ring-channel port and its peripheral device port.

18. The apparatus of claim 17, wherein the method implemented by the computer comprises:
communication modules sending status information on their inter-ring channels, including a module in the first ring sending a link tag on each data packet sent out on its DRP, wherein the link tag indicates to a receiving module in the second ring which port of the module in the first ring received the packet and which direction the packet is traveling.

19. The apparatus of claim 17, wherein the method implemented by the computer comprises:
communication modules detecting communication faults and sending fault detection information on their inter-ring channels, in order to direct data packets around broken ring-channel segments that may exist between modules.

20. The apparatus of claim 19, wherein the method implemented by the computer comprise:
sending a communication fault includes a first module of a set notifying a second module in the same set via the inter-ring channel responsive to the first module detecting a communication fault, wherein the notification includes an indication which of the pair of ring-channel ports of the first module detected the fault.

21. The apparatus of claim 19, wherein the method implemented by the computer comprises:
communication modules distinguishing between transmit and receive faults.

22. The apparatus of claim 19, wherein the method implemented by the computer comprises:
detecting a failure instance by a receiver of a module immediately adjacent and downstream of a first module, wherein the failure instance arises from the first module's transmitter or from a break between the two modules;
the module detecting the failure instance sending the first module a transmit fault code in a status carrier between data packets; and
responsive to receiving the transmit fault code, the first module notifying a module in the first module's set about the failure instance via their inter-ring channel.

23. The apparatus of claim 22, wherein a fault code indicates to the module in the first module's set the port that has failed and a type of fault that was detected.

24. The apparatus of claim 23, wherein the method implemented by the computer comprises:
the modules in a ring-configured channel automatically deactivating a link between two adjacent modules responsive to a failure, but not automatically activating a link elsewhere in the ring responsive to detecting disruption of only a single communication path in the ring.

* * * * *